United States Patent Office 3,164,443
Patented Jan. 5, 1965

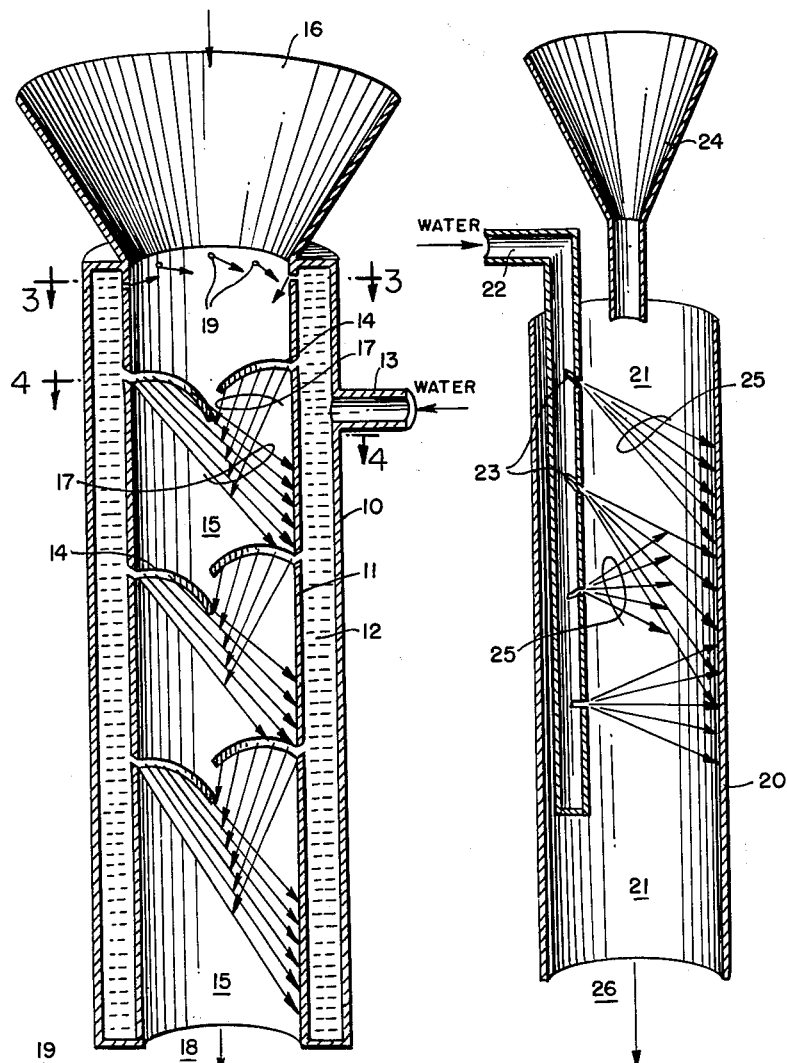

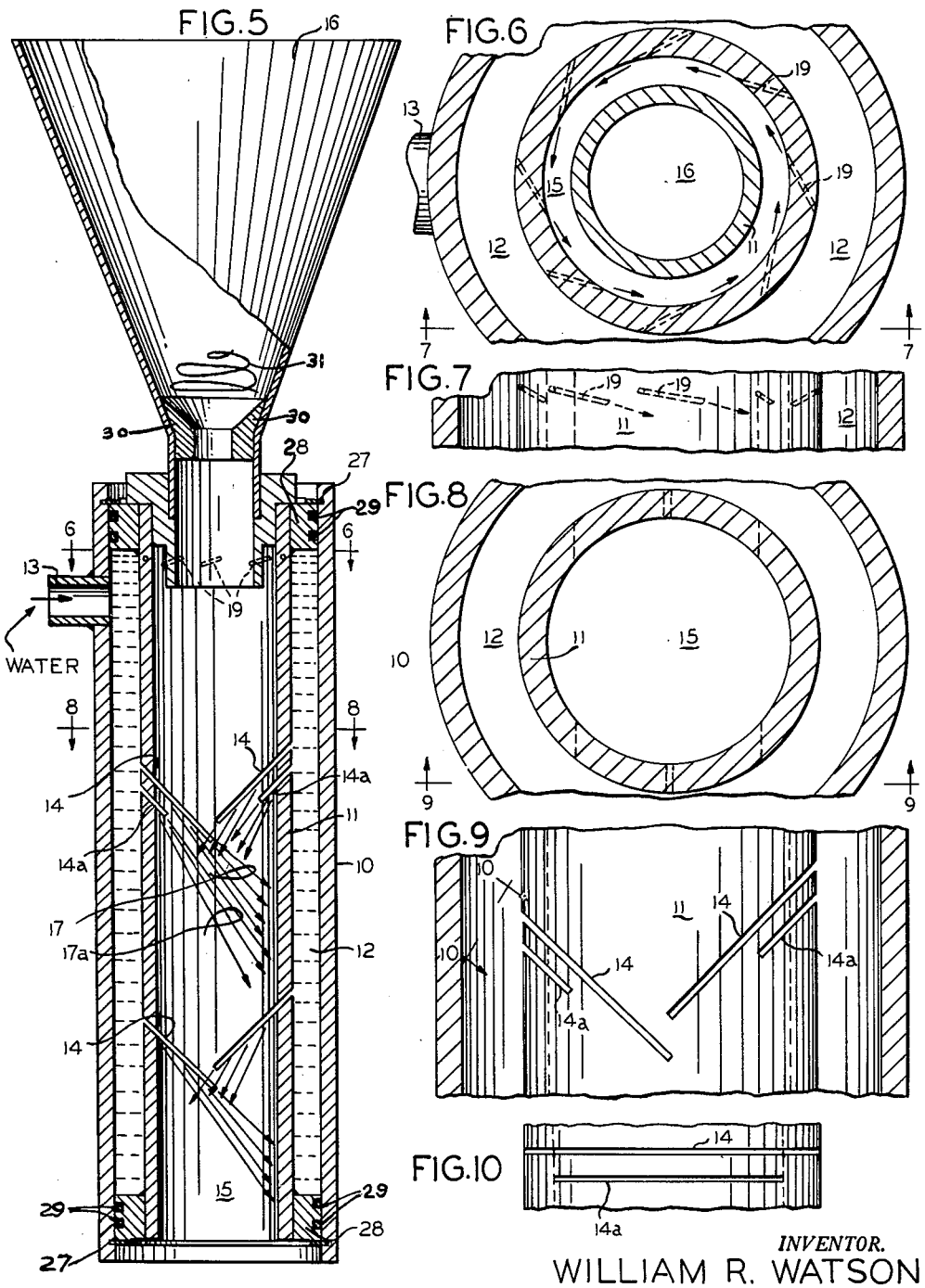

3,164,443
APPARATUS FOR WETTING GRANULAR OR
PULVERIZED MATERIALS
William R. Watson, Chicago, Ill., assignor to Nalco
Chemical Company, Chicago, Ill., a corporation of
Delaware
Filed Nov. 2, 1960, Ser. No. 67,451
7 Claims. (Cl. 23—267)

The present invention relates to a process for wetting granular or powdered solids and to apparatus for carrying out said process. This application is a continuation-in-part of my copending application, Serial No. 804,475, which was filed on April 6, 1959, now abandoned.

It is often difficult to dissolve high molecular weight resins as well as certain clays, starches, natural gums, etc., in water because individual particles of such materials tend to agglomerate during the dissolving operation forming capsulated clumps. The outer surfaces of these clumps gelatinize creating a nonpermeable coating, whereas the inner particles remain dry until the clump is dispersed. Ordinary low speed paddle or propeller type mixers do not produce sufficient agitation to allow water to reach these inner particles. A particularly difficult dispersion problem exists when attempts are made to dissolve a specific class of very high molecular weight ethylene oxide polymers sold by Union Carbide Corp. under the trademark "Polyox." Very dilute solutions, e.g., ¼% to ½% by weight, are extremely viscous and require great care in their preparation. One of the characteristics of these polymers is that they are susceptible to degradation when subjected to shear forces which are produced by many high speed mixing devices.

It is, therefore, an object of the present invention to provide a method of solubilizing or dispersing a dry material in water which does not cause the particles to agglomerate.

Another object of the invention is to provide a method of wetting a granular or powdered compound which prevents capsulated clumps from forming.

Still another object is to provide apparatus for carrying out a method of dispersing powdered material in water without causing the particles of the material to agglomerate.

A further object is to provide apparatus which can be used to form solutions of high molecular weight resins and other compounds which tend to agglomerate when wet.

Another object of the invention is to provide apparatus which can be disassembled without difficulty for cleaning purposes.

Other objects of the invention will become readily apparent to those skilled in the art from the following detailed description of the invention.

In general, the invention comprises the discovery that particles of high molecular weight resins and other materials can be readily dispersed or dissolved in water without causing the particles to agglomerate by passing the powdered or granular material through a series of water baffles within a mixing tube.

A more complete understanding of the invention may be gained from the following detailed description considered with the accompanying drawings in which:

FIG. 1 is a vertical sectional view through a preferred form of a mixing device constructed in accordance with the present invention;

FIG. 2 is a vertical sectional view through another form of mixing device that can be utilized in carrying out the present invention;

FIG. 3 is a sectional view taken along line 3—3 of FIG. 1;

FIG. 4 is a sectional view taken along line 4—4 of FIG. 1;

FIG. 5 is a vertical sectional view taken through an improved mixing device of the type shown in FIG. 1;

FIG. 6 is a fragmentary sectional view taken through line 6—6 of FIG. 5;

FIG. 7 is an elevational view taken along line 7—7 of FIG. 6;

FIG. 8 is a fragmentary sectional view taken through line 8—8 of FIG. 5;

FIG. 9 is an elevational view taken along line 9—9 of FIG. 8; and

FIG. 10 is a view taken along line 10—10 of FIG. 9.

A preferred embodiment of the invention is set forth in FIG. 1 and comprises an outer shell 10 and inner wall 11 which form an annular chamber 12. Water is supplied to the chamber through inlet 13 which is connected to a water source which is not shown. Inner wall 11 contains a series of slots 14 which provide passageways between chamber 12 and conduit 15. Slots 14, as can better be seen in connection with FIG. 4, and FIG. 9 can extend about halfway around inner wall 11 and are preferably constructed so that water leaving the slots is angled downwardly both to provide intersecting water baffles and to prevent splashing. The powdered or granular material to be dispersed or dissolved in the water is metered into funnel 16 from a source that is not shown. In passing through conduit 15, the particles of material are intercepted by water baffles 17. These baffles consist of layers of moving water which are formed by the water moving through the angled slots. After the material passes through the baffles, it exits at opening 18 from which it is conveyed to suitable containers. Several small holes 19 are drilled into inner wall 11 near the top of conduit 15. These holes are arranged so that water passing through them from chamber 12 wets the surface of wall 11 and thereby prevents the particles from adhering to the wall as they move from funnel 16 to water baffles 17.

In the embodiment of the invention described in FIG. 2, outer shell 20 of conduit 21 surrounds tubular chamber 22. Water is supplied to this chamber from a source that is not shown. Slots 23 in chamber 22 are constructed and arranged so as to allow water passing through the slots into the conduit to form baffles or layers 25. Powdered or granular resins or other materials that are to be either dispersed or dissolved in the water are metered into funnel 24 and are then moved through water baffles 25 that are set up within conduit 21. After the particles are thoroughly wet, they exit through opening 26 and are conducted to a suitable container.

FIG. 3 is a section view taken through line 3—3 of the preferred embodiment of the invention shown in FIG. 1. Small openings 19 are cut into inner wall 11 at an angle so that water passing through the openings from annular chamber 12 wets the surface of the wall. This arrangement prevents powder from sticking to the wall and also allows the major portion of the material to reach the first baffle in a substantially dry condition.

FIG. 4 is a section view taken through line 4—4 of FIG. 1. As can be seen, slot 14 extends about halfway around the circumference of inner surface 11 of annular chamber 12. Water leaving the slot forms a water baffle that is angled downwardly from a horizontal plane. By properly arranging the slots, pairs of adjacent baffles can be made to intersect thus producing several areas of high turbulence within conduit 15. The turbulent water breaks up clumps which may have formed and causes an immediate and complete wetting of the discrete particles. The downward direction of the upper water baffles is also important in that this feature prevents the particles leaving funnel 16 from being wet due to a backwash. Water baffle 17 substantially covers a section of conduit 15.

FIG. 5 is a vertical sectional view of an improved mixing device of the type shown in FIG. 1. In this embodiment, secondary slots 14a are shown as lying just beneath primary slots 14 in inner wall 11. These secondary slots, which preferably extend only about one-quarter of the way around inner wall 11, prevent the formation of dry spots within conduit 15. The secondary slots can conveniently be placed about one-quarter of an inch below slots 14. This distance can vary, of course, according to individual preference, and according to the dimensions of conduit 15 and the size of slots 14. Funnel 16 has also been extended in this embodiment below tangential holes 19. This change insures that the material being fed into the funnel will only come in contact with a wet surface within conduit 15. In order to facilitate cleaning of the apparatus, the inner tube of the apparatus has been removably positioned within the disperser. Retaining rings 27 maintain shoulder 28 and conduit wall 11 in a stationary position. O-rings 29 are positioned so as to prevent water from leaving chamber 12.

In a further improvement in the mixing device, funnel insert 30 is slidably mounted within funnel 16. Spring 31 is attached to insert 30 by means of a small hole in the lip of the insert. The spring (which can be an ordinary flashlight spring) prevents lumps of material from blocking the throat of the funnel.

FIG. 6 is a sectional view taken through line 6—6 of FIG. 5. Tangential openings 19 are cut through inner wall 11 at an angle so that the water passing through the openings from annular chamber 12 wets the surface of the wall. These openings are above the exit opening of funnel 16.

The elevational view of FIG. 7 shows tangential openings 19 and their relationship to inner wall 11 and chamber 12.

The cross-sectional view set forth in FIG. 8 shows the relative positions of outer wall 10, chamber 12, inner wall 11, and conduit 15.

Primary slots 14 and secondary slots 14a are shown in the enlarged elevational view of FIG. 9. Slots 14a prevent the formation of dry areas within conduit 15. As can be seen in this view, slots 14 can extend about halfway around inner wall 11.

The relative size of slots 14 and secondary slots 14a is also shown in FIG. 10. These slot sizes can be varied, of course, depending upon the nature of the material being dispersed and the dimensions of conduit 15.

When certain resins or other materials are passed through the subject apparatus, they do not immediately go into solution. In such instances it is necessary to transfer the solvent and solute to another container where mild agitation is applied to the components until the solution is formed. Even in these cases, however, the materials leave the exit opening of the conduit as individual particles and do not undergo clumping. Some substances go completely into solution in the apparatus.

The horseshoe-shaped primary and secondary slots in the inner shell of the annular chamber of the preferred embodiment of the invention as well as the upper slots in the small pipe of the embodiment described in FIG. 2 angle the water sprays downwardly to prevent a backwash from splashing and wetting the particles before they reach the first water baffle. Certain materials will be properly wet when passed through nonintersecting water baffles. Where difficultly soluble compositions having strong capsulating tendencies are involved, however, superior results are obtained by angling the slots so that pairs of adjacent baffles intersect. The number of slots cut into the inner wall of the annular chamber of my preferred embodiment and in the pipe of FIG. 2 is governed by the length of the particular conduit and the capsulating tendency of the material being dispersed or dissolved. Ordinarily, from about 4 to about 6 water baffles will be sufficient to adequately condition the compounds. The size of the slots is also variable. It is preferred, however, that the slots be long enough to produce a layer of water which substantially covers a section of the conduit. In the embodiment shown in FIGS. 1 and 5, it has been found that slots which cover about half the circumference of the inner wall of the annular chamber provide suitable water baffles.

The pressure applied to the water should be sufficient to form a stream across the conduit. The exact pressure needed will vary, of course, depending upon the area of the conduit, the number of slots in the inner wall of the annular chamber and the length and width of the slots.

As was indicated above, the length of the primary slots should be sufficient to form a water layer across the entire area of conduit 15. The width of the slots can be varied widely. It has been found, however, that a water saving is obtained when the slots are cut thin. A cut of from 0.020 inch to about 0.024 inch is satisfactory for most purposes. Larger cuts, of course, can also be employed where water economy is not critical. The more slots that are present and the larger they are, the less pressure there will be in the system without the use of a pump or other pressure producing instrument. It has been found that from 30–40 lbs. of pressure works very well in the embodiments shown in FIGS. 1, 2 and 5.

As was pointed out above, the subject method and apparatus is especially effective when used on any material that tends to agglomerate when wet. In particular, unexpected and highly desirable results have been obtained when high molecular weight ethylene oxide polymers are solubilized in this equipment. One-half ($\frac{1}{2}$) to five (5) percent aqueous solution of these polymers have a viscosity in centipoises at 25° C. of from 500 to 30,000. For most industrial applications such polymers have molecular weights in excess of one million. The lower molecular weight materials have molecular weights starting at about two hundred thousand. These polymers are prepared by heating appropriate quantities of ethylene oxide with an initiating molecule such as ethanol, ethylene glycol, or the like, in a sealed tube for six hours or more in the presence of a catalyst. Suitable catalysts include alkaline earth metal carbonates such as strontium or calcium carbonate. Other materials that are suitably treated in this apparatus are various polymeric polyelectrolytes such as polyacrylamide, polyacrylic acid, polyvinyl alcohol, polyvinyl acetate, polyvinyl pyrrolidone, and copolymers made from the monomers of the above in conjunction with other monomers such as styrene and maleic anhydride. Specific examples of these water-soluble polyelectrolytes are set forth in U.S. Patent 2,625,471 which issued to David T. Mowry and Ross M. Hedrick on January 13, 1953. Other materials that are successfully dispersed or dissolved by this device include clays, starches, natural gums, talc, etc. Additionally, mixtures of the above materials can likewise be treated by the subject method and apparatus.

The following is a specific example of the use of the present method and apparatus in dissolving and/or dispersing an ethylene oxide polymer of high molecular weight in water. An ethylene oxide polymer having a centipoise viscosity in a 1% solution of 30,000 at 25° C. and having an average U.S. mesh size of about 60 with the smallest and largest particles ranging from 10–20 to 140, was metered into funnel 16 of the embodiment of the invention described in FIGS. 1, 3 and 4. Water was passed from a pipe connected to the city water system through inlet 13 into annular chamber 12. The amount of water and material flowing through conduit 15 was controlled so that a ¼% by weight solution was formed. The apparatus was eighteen inches in length, the inner shell had a diameter of three inches. There were six slots in the wall of the conduit which were constructed so that water baffles from the slots were angled downwardly 45° and intersected each other in pairs. Four small openings 19 were cut into the inner wall of the chamber at an angle which caused water to flow around and down the walls without wetting the powder as it came from the funnel. Water pressure in the system of from 30 to 40 p.s.i. was sufficient to maintain the water baffles. Each of the baffles intercepted the powder as it moved from the funnel to exit opening 18. After passing through the exit it was found that every particle of material had been wet and that no clumping had occurred. The mixture was then conducted to a container where it went into solution under the influence of mild agitation.

The present apparatus can also be employed as a blending device. In this case, air under pressure is forced through inlet 13 into annular chamber 12 and out through slots 14. Air baffles are therefore formed rather than water baffles. It has been discovered that these baffles thoroughly blend mixtures of materials which are metered into the conduit through funnel 16.

It will be obvious to those skilled in the art that the devices shown may be modified to produce similarly useful results. Thus, for instance, the slots may be replaced by a plurality of holes formed into a configuration approximating the shape of the slots. Also the slots may be substituted by a plurality of high pressure nozzles adapted to produce a suitable water baffle in the conduit.

The invention is hereby claimed as follows:

1. An apparatus for wetting particles of a given material which comprises: a vertically arranged cylindrical conduit having an inlet and outlet end for said particles, said inlet being at the top of said conduit and said outlet being at the bottom of said conduit, a tubular member within said conduit and adjacent one wall of said conduit, said member being connected to a suitable water source, said tubular member containing a series of downwardly directed slots extending partially around said member which connect the interior of said member and said conduit, said slots being constructed and arranged so that water passing from said tubular member to the conduit forms layers of moving water within said conduit, means for delivering said particles of said material to said conduit, and means for removing said particles from said conduit after they are thoroughly wet.

2. An apparatus for wetting particles of a given material which comprises: a vertically arranged cylindrical outer shell, an inner wall defining a cylindrical conduit within said outer shell, said conduit having an inlet opening for said particles at the top of said wall and having an outlet opening at the bottom of said wall, said inner wall being spaced equidistant from said outer shell, the space between said inner wall and said shell forming an annular chamber, said inner wall being removably positioned within said outer shell, said inner wall containing a series of downwardly directed slots extending partially around said wall and connecting said annular chamber and said conduit, said slots being constructed and arranged so that water passing from said chamber to said conduit forms layers of moving liquid within said conduit, said slots also being so angled and so spaced that adjacent pairs of said water layers are made to intersect, means for delivering water to said annular chamber, and means for delivering particles of said material to said conduit.

3. An apparatus for wetting particles of a given material which comprises: a vertically arranged cylindrical outer shell, an inner wall defining a cylindrical conduit within said outer shell, said conduit having an inlet opening for said particles at the top of said wall and having an outlet opening at the bottom of said wall, said inner wall being spaced equidistant from said outer shell, the space between said inner wall and said shell forming an annular chamber, said inner wall being removably positioned within said outer shell, said inner wall containing a series of downwardly directed primary slots extending partially around said wall and connecting said annular chamber and said conduit, said slots being constructed and arranged so that water passing from said chamber to said conduit forms layers of moving liquid within said conduit, said slots also being so angled and so spaced that adjacent pairs of said water layers are made to intersect, downwardly directed secondary slots associated with and positioned beneath at least one of said primary slots, said secondary slots serving to prevent the formation of dry areas within said conduit, means for delivering water to said annular chamber, and means to deliver particles of said material to said conduit.

4. An apparatus for wetting particles of a given material which comprises: a vertically arranged cylindrical outer shell, an inner wall defining a cylindrical conduit within said outer shell, said inner wall being spaced equidistant from said outer shell, the space between said inner wall and said shell forming an annular chamber, said inner wall being removably positioned with said outer shell, said inner wall containing a series of downwardly directed slots extending partially around said wall and connecting said annular chamber and said conduit, said slots being constructed and arranged so that water passing from said chamber to said conduit forms layers of moving liquid within said conduit, said slots also being so angled and so spaced that adjacent pairs of said water layers are made to intersect, small openings in the upper portions of said inner wall, said openings connecting said chamber to said conduit and being angled so that water passing from said chamber wets the walls of said conduit, means for delivering water to said annular chamber, and means to deliver particles of said material to said conduit, said particle delivering means consisting of a funnel the exit opening of which extends below said small openings in the upper portion of said inner wall.

5. An apparatus for wetting particles of a given material which comprises: a vertically arranged cylindrical outer shell, an inner wall defining a cylindrical conduit within said outer shell, said inner wall being spaced equidistant from said outer shell, the space between said inner wall and said shell forming an annular chamber, said inner wall being removably positioned within said outer shell, said inner wall containing a series of downwardly directed primary slots extending partially around said wall and connecting said annular chamber and said conduit, said slots being constructed and arranged so that water passing from said chamber to said conduit forms layers of moving liquid within said conduit, said slots also being so angled and so spaced that adjacent pairs of said water layers are made to intersect, downwardly directed secondary slots associated with and positioned beneath at least one of said primary slots, said secondary slots serving to prevent the formation of dry areas within said conduit, small openings in the upper portions of said inner wall, said openings connecting said chamber to said conduit and being angled so that water passing from said chamber wets the walls of said conduit, means for delivering water to said annular chamber, and means to deliver particles of said material to said conduit, said particle delivering means consisting of a funnel the exit opening of which extends below said small openings in the upper portion of said inner wall.

6. An apparatus for wetting particles of a given material which comprises: a vertically arranged cylindrical outer shell, an inner wall defining a cylindrical conduit within said outer shell, said inner wall being spaced equidistant from said outer shell, the space between said inner wall and said shell forming an annular chamber, said inner wall being removably positioned within said outer shell, said inner wall containing a series of downwardly directed primary slots extending partially around said wall and connecting said annular chamber and said conduit, said slots being constructed and arranged so that water passing from said chamber to said conduit forms layers of moving liquid within said conduit, said slots also being so angled and so spaced that adjacent pairs of said water layers are made to intersect, downwardly directed secondary slots associated with and positioned beneath at least one of said primary slots, said secondary slots serving to prevent the formation of dry areas within said conduit, small openings in the upper portions of said inner wall, said openings connecting said chamber to said conduit and being angled so that water passing from said chamber wets the walls of said conduit, means for delivering water to said annular chamber, means to deliver particles of said material to said conduit, said particle delivering means consisting of a funnel the exit opening of which extends below said small openings in the upper portion of said inner wall, a hollow insert which is frictionally placed within the throat of the funnel, and a spring attached to and extending above the opening of the funnel insert.

7. An apparatus for wetting particles of a given material which comprises: a vertically arranged cylindrical outer shell, an inner wall defining a cylindrical conduit within said outer shell, said inner wall being spaced equidistant from said outer shell, the space between said inner wall and said shell forming an annular chamber, said inner wall containing a series of downwardly directed slots extending partially around said wall and connecting said annular chamber and said conduit, said slots being constructed and arranged so that water passing from said chamber to said conduit forms layers of moving liquid within said conduit, said slots also being so angled and so spaced that adjacent pairs of said water layers are made to intersect, means for delivering water to said annular chamber, and means for delivering particles of said material to said conduit.

References Cited in the file of this patent
UNITED STATES PATENTS

| | | |
|---|---|---|
| 2,075,867 | Sampel | Apr. 6, 1937 |
| 2,224,355 | Moller | Dec. 10, 1940 |
| 2,307,509 | Joachim et al. | Jan. 5, 1943 |
| 2,653,801 | Fontein | Sept. 29, 1953 |
| 2,686,080 | Wood | Aug. 10, 1954 |
| 2,978,299 | Milne | Apr. 4, 1961 |